(12) United States Patent
Fanson et al.

(10) Patent No.: US 7,829,492 B2
(45) Date of Patent: Nov. 9, 2010

(54) MICROWAVE ASSISTED DESULFURIZATION OF NITROGEN OXIDE STORAGE REDUCTION CATALYSTS

(75) Inventors: Paul T Fanson, Brighton, MI (US); Hirohito Hirata, Shizuoka (JP); Masaya Ibe, Shizuoka (JP); Steven L Suib, Storrs, CT (US); Sinue Gomez, West Hartford, CT (US); Kinga Malinger, Storrs, CT (US)

(73) Assignees: Toyota Motor Corporation, Toyota (JP); The University of Connecticut, Farmington, CT (US)

( * ) Notice: Subject to any disclaimer, the term of this patent is extended or adjusted under 35 U.S.C. 154(b) by 1006 days.

(21) Appl. No.: 11/342,776

(22) Filed: Jan. 30, 2006

(65) Prior Publication Data

US 2006/0252630 A1    Nov. 9, 2006

Related U.S. Application Data

(60) Provisional application No. 60/648,467, filed on Jan. 31, 2005.

(51) Int. Cl.
    *B01J 38/06* (2006.01)
(52) U.S. Cl. .......................................... 502/55; 502/53
(58) Field of Classification Search .................. 502/53, 502/55
    See application file for complete search history.

(56) References Cited

U.S. PATENT DOCUMENTS

| | | | | |
|---|---|---|---|---|
| 4,144,189 A | * | 3/1979 | Kirkbride | 502/5 |
| 5,763,348 A | * | 6/1998 | Fung et al. | 502/37 |
| 6,300,268 B1 | * | 10/2001 | Lapidus et al. | 502/38 |

* cited by examiner

*Primary Examiner*—Edward M Johnson
(74) *Attorney, Agent, or Firm*—Gifford, Krass, Sprinkle, Anderson & Citkowski, P.C.

(57) ABSTRACT

A process for removing sulfur and sulfur compounds from a catalyst includes the following steps: exposing the catalyst to a reducing atmosphere and exposing the catalyst to microwave energy. Desorption of the sulfur and sulfur compounds from the catalyst occurs at a temperature less than 600 degrees centigrade.

20 Claims, 2 Drawing Sheets

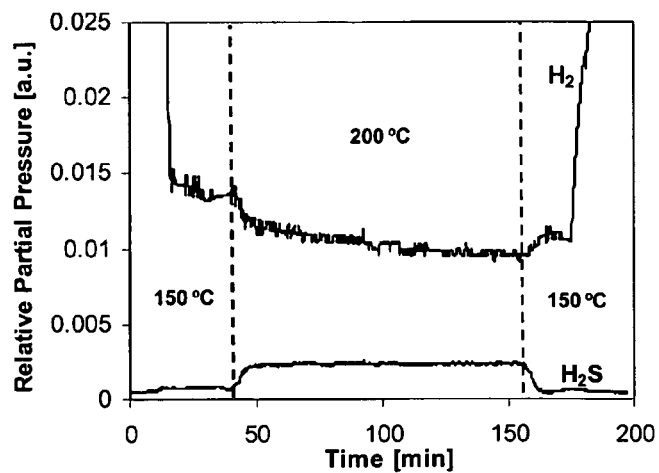
Figure 1. Thermal desorption of sulfur from the sulfur-poisoned NSR catalyst placed in a microwave field and exposed to 1% $H_2$/He between 150 and 200°C.
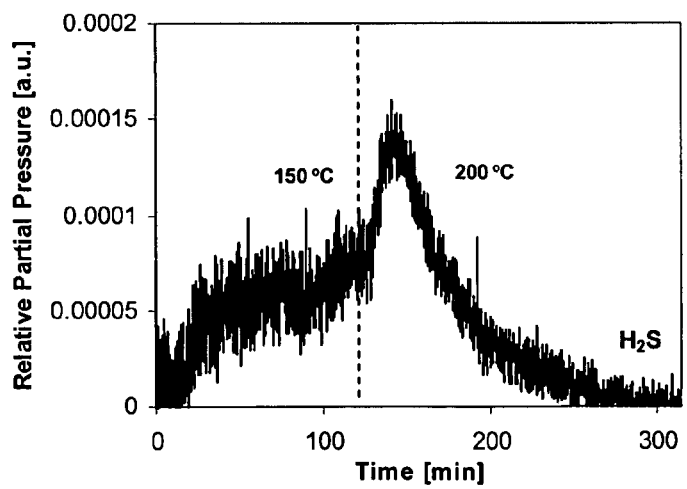
Figure 2. Thermal desorption of sulfur from the sulfur-poisoned NSR catalyst placed in a microwave field and exposed to 10% $H_2$/He between 150 and 200°C.

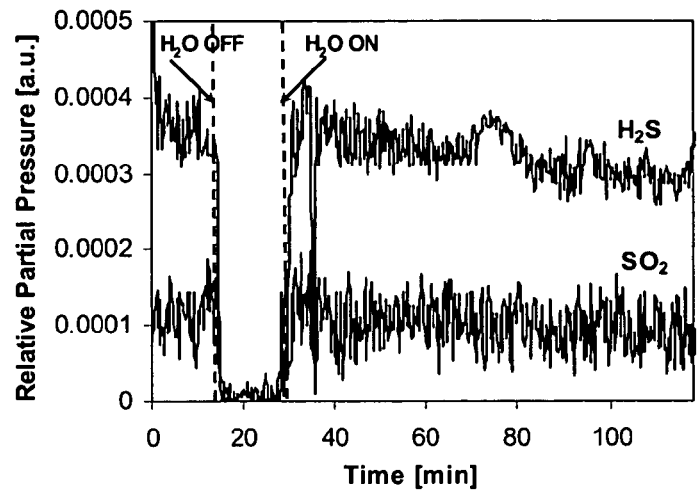
Figure 3. Thermal desorption of sulfur from the sulfur-poisoned NSR catalyst placed in a microwave field and exposed to 1% $H_2$/He and a controlled input of water at 150°C.
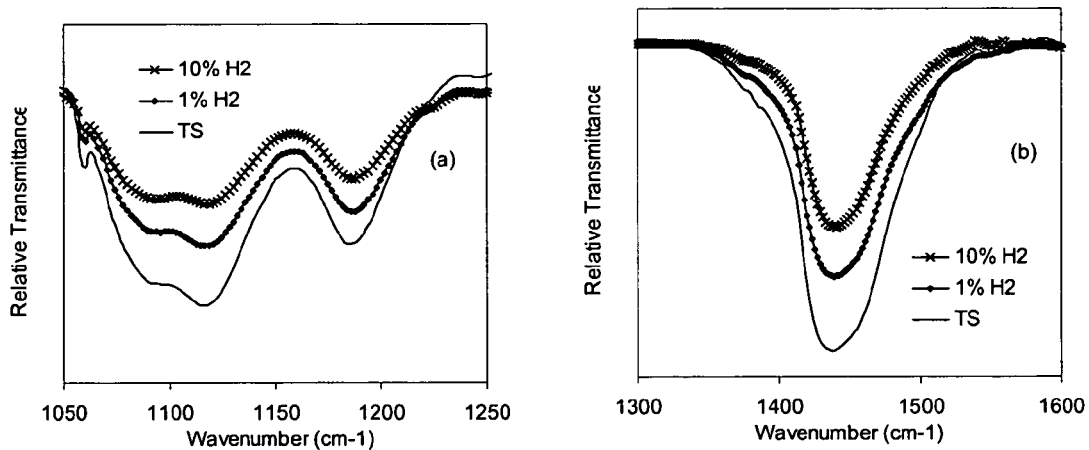
Figure 4. FTIR spectra of sulfur poisoned NSR catalysts and catalysts treated with microwave heating at 200 °C under varying reducing atmospheres.

MICROWAVE ASSISTED DESULFURIZATION OF NITROGEN OXIDE STORAGE REDUCTION CATALYSTS

RELATED APPLICATION

This application claims priority of U.S. Provisional Patent Application Ser. No. 60/648,467 filed Jan. 31, 2005, which is incorporated herein by reference.

FIELD OF THE INVENTION

The invention relates to a process for removing sulfur compounds from a catalyst and more particularly to a process for removing sulfur compounds from a nitrogen oxide storage catalyst.

BACKGROUND OF THE INVENTION

In a worldwide effort to protect the global environment, a growing demand for cleaner exhaust gases and better fuel economy is necessary. A lean-burn engine is an effective technology to improve fuel economy. However, lean-burn engines produce oxygen-rich exhaust gases in which the removal of nitrogen oxides ($NO_x$) is particularly difficult using a conventional 3-way catalyst. In order to overcome this problem, $NO_x$ storage-reduction (NSR) catalysts have been developed. The NSR catalyst includes a storage element, typically barium oxide and a reduction-oxidation component, typically Pt. Therefore, during lean operation, $NO_x$ species are stored as nitrates, and during rich or stoichiometric operation, the stored $NO_x$ is reduced to nitrogen.

A problem associated with a NSR catalyst is the decrease in performance caused by deactivation of the catalyst by sulfur. Sulfur poisoning of the catalyst occurs by a competitive sorption of sulfur oxides ($SO_x$) derived from combustion of sulfur species contained in the fuel. $SO_x$ species react with the catalyst in the same way $NO_x$ species do, causing the catalyst to deteriorate. Sulfur poisoning occurs in two different ways. One is the oxidation of $SO_2$ by the precious metal to further react with a carrier such as alumina to form aluminum sulfate. The second mechanism is the reaction of $SO_x$ with the storage component of the catalyst to form sulfates ($BaSO_4$), which are more stable than the nitrates. Thus, once the storage component contains sulfates, the NSR catalyst can no longer store $NO_x$.

In order to improve the durability of the catalyst, one may suppress sulfur adsorption and promote sulfur desorption. Regeneration of NSR catalysts by desorption of the sulfur species only occurs under reducing atmospheres at temperatures greater than 600° C. Desorption of sulfur species in the form of $H_2S$ occurs more readily in a $H_2$ atmosphere at 600° C., than in a propene or carbon monoxide flow, where removal of sulfur occurs at temperatures above 650° C.

Due to the high temperatures required for sulfur removal using conventional heating, there is therefore a need in the art for an improved process for the removal of sulfur from a catalyst.

SUMMARY OF THE INVENTION

A process for removing sulfur and sulfur compounds from a catalyst includes the following steps: exposing the catalyst to a reducing atmosphere and exposing the catalyst to microwave energy. Desorption of the sulfur and sulfur compounds from the catalyst occurs at a temperature less than 600 degrees centigrade.

BRIEF DESCRIPTION OF THE DRAWINGS

FIG. 1 is a figure of the relative partial pressure of hydrogen and hydrogen sulfide plotted against time for different temperatures and an exposure to a 1% hydrogen and helium reducing atmosphere;

FIG. 2 is a figure of the relative partial pressure of hydrogen sulfide plotted against time for different temperatures and an exposure to a 10% hydrogen and helium reducing atmosphere;

FIG. 3 is a figure of the relative partial pressure of hydrogen and hydrogen sulfide plotted against time for different temperatures and an exposure to a 1% hydrogen and helium reducing atmosphere in the presence of water;

FIG. 4a is a plot of the FTIR spectra of a sulfur poisoned catalyst exposed to various reducing atmospheres in the 1050 to 1250 $cm^{-1}$ range;

FIG. 4b is a plot of the FTIR spectra of a sulfur poisoned catalyst exposed to various reducing atmospheres in the 1300 to 1600 $cm^{-1}$ range.

DETAILED DESCRIPTION OF THE PREFERRED EMBODIMENTS

There is described a process for removing sulfur and sulfur containing compounds from a catalyst. The process includes exposing the catalyst to a reducing atmosphere and exposing the catalyst to microwave energy. The process removes the sulfur from the catalyst at a significantly reduced temperature in comparison to a conventional heating process requiring a temperature grater than 650 degrees centigrade.

For the purposes of describing the process of the present invention a $NO_x$ storage-reduction (NSR) catalyst having a precious metal and an alkaline metal both dispersed in a metal oxide support material will be discussed. The precious metal may be an element such as Platinum, Palladium, Rhodium, Silver and Gold. The alkaline metal may be an element such as Sodium, Magnesium, Potassium, Calcium, Rubidium, Strontium, Cesium, and Barium. The metal oxide support material may be a composition or compound such as Aluminum Oxide, Cesium Oxide, Titanium Oxide, Zirconium Oxide and Silicon Oxide. While the description focuses on the NSR catalyst for the purposes of describing the process of the present invention, it is to be realized that the process of the present invention may also be utilized on other catalysts including: a 3-way catalyst having a precious metal dispersed in a metal oxide support material, such as Aluminum Oxide, Cesium Oxide, Titanium Oxide, Zirconium Oxide and Silicon Oxide; a hydrocracking catalyst; hydrodesulfurization catalysts; and activated carbon used as a sulfur trap. The 3-way catalyst may also include a base metal such as Iron, Copper, Nickel, and Manganese.

A NSR catalyst having a barium oxide storage element and a Platinum reduction-oxidation component dispersed on an Aluminum Oxide support material will be described in conjunction with the process of the present invention. Removal of sulfur in the NSR catalyst can take place under a reducing atmosphere in this case, $H_2$ by equations 1 and 2:

$$BaSO_4(s) + H_2(g) \rightarrow BaO(s) + SO_2(g) + H_2O \qquad (1)$$

$$BaSO_4(s) + 4H_2(g) \rightarrow BaO(s) + H_2S(g) + 3H_2O \qquad (2)$$

As can be seen from the above reactions, the sulfur may be removed in the form of Hydrogen sulfide or Sulfur dioxide.

As described above, the process of the present invention includes exposing a catalyst to a reducing atmosphere. The reducing atmosphere may be combustion exhaust gases having components such as, water, carbon monoxide, carbon dioxide, oxygen, nitrogen oxide, nitrogen dioxide, hydrogen and hydrocarbons. The reducing atmosphere may also be any other typical reducing gas, such as hydrogen, which may be dispersed in a carrier gas, such as helium.

The process of the present invention also includes the step of exposing the catalyst to microwave energy. The microwave energy may have a power of from 0.001 to 5000 Watts. Additionally, the microwave energy may have a frequency of from 2.0 to 4.0 Gigahertz. Microwave (MW) heating is fundamentally different from conventional heating. As opposed to the generation of heat by external sources as in conventional heating, the generation of heat in microwaves is produced by the interaction between molecules in the heated material and the electromagnetic field created in the MW oven. With microwaves, energy can be delivered to reacting molecules at a much greater rate if compared to conventional heating, which makes a more efficient way to heat, since microwaves allow faster and more uniform heating. The process of the present invention therefore requires a lower temperature than 600 degrees centigrade, the typical temperature needed to remove sulfur from a catalyst.

EXAMPLES

The catalysts described in the following section were made using standard wet impregnation and had a nominal composition of 2 wt % Pt and 20 wt % Ba supported on $\gamma$-$Al_2O_3$ prior to poisoning with $SO_2$. About 30 mg of the catalyst was packed between quartz wool plugs in a quartz tubular reactor. The untreated sulfur-poisoned NSR catalyst and the microwave treated catalyst will be referred to as TS and TS-MW, respectively.

Sulfur desorption experiments were performed using a MW oven model 10-1300 purchased from Microwave Materials Technology in Knoxville, Tenn. The temperature of the oven was regulated using a Micristar controller and a K type thermocouple, which is in close contact with the catalyst. The system was set up for automatic control of temperature. Microwaves were generated at 2.45 GHz with a maximum variable power supply of 1.3 kW. Desorption experiments were carried out at atmospheric pressure in a continuous flow fixed-bed tubular quartz reactor with Teflon fittings.

For the sulfur desorption experiments, 30 mg of the TS catalyst was used. Previous to MW desulfurization treatment, the catalysts where pretreated overnight in He at room temperature. The experiments were carried out in the presence of different gas streams. The reducing gases used were 1% $H_2$/He and 10% $H_2$/He, at a flow rate of 40 mL/s. Desorption tests were performed at temperatures ranging from 150° C. to 200° C. and at a temperature ramp rate of 10° C./min. Sulfur desorption analyses were also performed in the presence of water, under conditions similar to those described above. A peristaltic pump was used to feed water to the system. Desorbed sulfur compounds were monitored using an on-line MKS-UTI PPT quadrupole mass spectrometer (MS).

The presence of sulfur species on the TS catalyst before and after MW treatment was measured by Ion-Chromatography (IC), X-ray photoelectron spectroscopy (XPS), and Fourier transform infrared (FTIR) spectroscopy.

A Dionex IC, model DX-500 was used to determine the amount of sulfate present in the catalysts. FTIR experiments were recorded on a Nicolet Magna 750 FT-IR spectrometer in the 2500-1000 $cm^{-1}$ range using a DTGS detector. The samples were diluted in KBr. XPS data were collected on a Leybold-Heraeus (LH) Model 10 spectrometer equipped with a SPECS EA10 MCD hemispherical analyzer. The samples were pressed in indium foil to minimize charging. Narrow and wide scans of all elements were collected for the prominent photoelectron transitions and X-ray excited Auger transitions.

Experiments carried out in the presence of 1% $H_2$/He at 150° C. and 200° C. show that desorption of $H_2S$ became prominent at 200° C., as shown in FIG. 1. Desulfurization was not completed after 2 hours of the experiment. $H_2S$ desorption was accompanied by complementary $H_2$ consumption. Reducing atmospheres and interactions with microwaves promoted the desorption of sulfur from the poisoned catalyst in the form of $H_2S$.

Desulfurization was also carried out in gas mixtures of 10% $H_2$/He, and in this case $H_2S$ desorption also became significant at 200° C. For 10% $H_2$ the process seemed to be completed after 5 hours of microwave heating, as shown in FIG. 2.

Since microwaves interact very efficiently with water, some experiments were carried out in the presence of hydrogen and water. To study the effect of water in the desulfurization process the input of water to the system was controlled. The water supply was interrupted at times while the reducing gas was continuously fed to the reactor. Desorption of $H_2S$ occurred at 150° C. during this experiment. In contrast, $H_2S$ desorption in 10% $H_2$/He occurred in the absence of steam at 200° C. These results show that the presence of water allows the catalyst to absorb microwave radiation more efficiently, and thus lowers the desorption temperature.

FIG. 3 represents the desorption profile of $H_2S$ and $SO_2$ from the TS catalyst in the presence of steam and microwaves at 150° C. A significant increase in the $H_2S$ relative partial pressure was observed when water was introduced to the system. In addition, $H_2S$ desorption decreased dramatically as feeding water to the reactor was stopped. When the water was fed again, the $H_2S$ partial pressure increased approximately to the previous level. This indicates that water has a positive effect on desulfurization of TS. A similar profile was also observed for $SO_2$. However, $SO_2$ partial pressure was much lower as compared to $H_2S$. In FIG. 3, the partial pressure of $SO_2$ is multiplied by a factor of 5. The first 110 minutes of the reaction are not shown due to the initial fluctuations of the flow.

The sulfate species present in the poisoned catalyst were investigated by Fourier transformed infrared experiments (FTIR). FTIR spectra of the TS and TS-MW catalysts were recorded in the 2500-1000 $cm^{-1}$ range.

FIG. 4 shows the FTIR spectra of the poisoned catalyst before and after microwave heating under a hydrogen atmosphere. After the MW treatments the characteristic bands of the catalyst are still present, however differences in band intensities can be observed. FIG. 4a shows the IR absorption region of 1050-1250 $cm^{-1}$. The bands at 1120 and 1090 $cm^{-1}$ are characteristic for the S—O stretching vibrations of bidentate sulfates located on the surface of an alkaline earth metal, thus corresponding to $BaSO_4$ present on the surface of the catalyst. For both MW treated samples changes in intensity are observed in the 1185 $cm^{-1}$ band, which corresponds to bulk barium sulfate species. The band at 1060 $cm^{-1}$ is characteristic of $Al_2(SO_4)_3$ species, and its intensity also decreases when the sample is subjected to the treatment.

FIG. 4b shows the region in the spectrum corresponding to the characteristic bands for $BaCO_3$. In this type of catalyst, Ba appears as a mixture of the oxide and the carbonate species. The intensity of the carbonate band decreases for the treated samples in comparison to the untreated catalyst. This decrease is more pronounced for the sample treated with a higher percentage of $H_2$.

Table 1 shows the percentage of the type of species removed from the poisoned TS catalysts after MW treatment in hydrogen. The FTIR results can give us an idea of the type of sulfur species desorbed from the catalyst. As observed in Table 1, the amount of aluminum sulfate removed from the catalysts is greater than the amount of barium sulfate species. It has been reported that $Al_2(SO_4)_3$ decomposes at lower temperatures than $BaSO_4$ when treated with conventional heating. Therefore, it makes sense that under MW heating sulfate species are desorbed first from $Al_2(SO_4)_3$. Table 1 also shows that the sample treated with 1% $H_2$ has a greater consumption of $Al_2(SO_4)_3$, compared to $BaSO_4$, than the sample treated with 10% $H_2$.

Ion Chromatography (IC) and X-ray photoelectron spectroscopy (XPS) were used to analyze the bulk species as well as the surface species, respectively. Table 2 reports the amount of sulfate detected using IC before and after MW treatment. The amount of sulfate species is reduced after MW treatment compared to the untreated, S-poisoned TS catalysts. The sample treated in 10% $H_2$ shows the lowest amount of $SO_4^{2-}$, however the difference in the amount of sulfate is not significant, even though the amount of time the sample was treated was double the time compared to the sample treated with only 1% $H_2$.

X-ray photoelectron spectroscopy (XPS) was used to analyze the atomic surface concentration of the elements present in the poisoned NSR catalysts. The atomic concentration for the S 2p, C 1s and O 1s of the untreated poisoned catalyst and treated TS samples determined by XPS are shown in Table 2. The binding energy (BE) values obtained for S 2p (169.31-169.42 eV) and C 1s (289.98-290.08 eV) are characteristic of sulfate species and carbonate species, respectively.

As observed in Table 3, the atomic concentration of sulfate species in the TS catalyst is reduced after MW treatment. In agreement with the IC data, increasing the $H_2$ concentration from 1% to 10% does not cause a significant improvement in desorption of sulfate species, even after 300 min of reaction of the sample treated with 10% $H_2$. The results of the FTIR, ICP, and XPS experiments are all consistent with the decrease in sulfur species using MW treatment.

A decrease in oxygen concentration is also observed for the treated TS catalyst, which is expected since the treatment takes place under reducing atmospheres. The higher the concentration of a reducing gas, the less oxygen is found in the surface of the catalysts.

Both IC and XPS data showed similar results in terms of total amount of sulfate species removed from the NSR catalyst. However, XPS shows a higher amount of sulfates removed than the amount determined in the bulk by IC (62%). Since XPS is a surface technique, the collected data directly reflects the surface of the catalyst and therefore, the results indicate that the majority of the sulfur species present in the catalyst are selectively removed from its surface.

On the other hand, FTIR results showed that $Al_2(SO_4)_3$ is preferentially removed from the NSR catalyst. The total amount of sulfate species removed from the catalyst is not greatly influenced by the concentration of the reducing gas. Overall the total amount of sulfur species removed does not change drastically when the hydrogen concentration is increased from 1% to 10%. However, the amount of hydrogen seems to have an effect on the type of sulfur species being decomposed. It is possible that when 10% $H_2$ is used the availability of hydrogen to $BaSO_4$ centers increases, thus other sulfur species than $Al_2(SO_4)_3$ have more accessibility to the gas to react and get removed. When higher amounts of hydrogen are used more $BaSO_4$ species are removed, which is advantageous in terms of reusability of the catalyst, since more barium, the storage component of the catalyst, is being regenerated.

The results show that desorption of sulfur species in the TS catalysts can take place at temperatures in the 150-200° C. range using MW heating and $H_2$ as the reducing gas. For MW heating to take place it is necessary to have effective coupling between components of the target material and the oscillating electrical field of the microwaves. The difference between conventional heating and MW heating is based on the composition of the material to be heated and its capacity to absorb the microwave energy. The TS catalyst is a complex material with different components such as barium oxides, sulfates, and carbonates, platinum, and alumina, which all have different MW absorption capacities. Differential adsorption of microwaves will lead to differential heating and localized thermal inhomogeneities, when compared to conventional heating. Therefore, efficient heating will occur within those species that are able to absorb MW radiation. One of the mechanisms of interaction of MW with matter is by ionic conduction. Ions are charged species that can couple with the oscillating electrical field of MW and generate heat. Barium sulfate is an ionic material, which can interact with MW and heat and further react with the reducing gas to form $H_2S$. However, the effectiveness of the heating depends on the concentration of ions distributed within the catalyst. The energy delivered by microwaves is insufficient for breaking covalent chemical bonds.

Another way microwaves interact with matter is by dipole interactions, as in the case of water molecules. Dipoles, such as water, continually react with the oscillating electric field of the MW attempting to align in the field, and therefore generate heat. A distribution of the heat is then uniformly produced throughout the material. Water has a positive effect in terms of desorption of sulfur from the TS catalyst. In the presence of water, desorption of $H_2S$ occurred at 150° C. In contrast, $H_2S$ desorption in 10% $H_2$/He in the absence of steam occurred at 200° C. These data show that the presence of water in these systems allows the catalyst to absorb microwave radiation more efficiently, lowering the desorption temperature.

While the above examples provide a description of the process of the present invention, they should not be read as limiting the process of the present invention. Specifically, various concentrations of a reducing atmosphere may be utilized by the present invention in an effort to improve the decomposition of various sulfur compounds. For example, concentrations of from 1000 ppm to 10% of $H_2$ or a similar reducing atmosphere may be utilized by the present invention.

TABLE 1

Calculated percentage of sulfate species removed after treatment in hydrogen gas, based in FTIR results[a]

| Sample | % $Al_2(SO_4)_3$ | % surface $BaSO_4$ | % bulk $BaSO_4$ |
|---|---|---|---|
| TS-MW 1% $H_2$/He | 85 | 28 | 25 |
| TS-MW 10% $H_2$/He | 57 | 48 | 47 |

[a]The percentages were calculated based on the integrated peak areas from the FTIR spectra.

TABLE 2

IC data obtained for treated and untreated poisoned NSR catalyst

| Sample | $SO_4^{2-}$ wt. % | Time of MW treatment, min |
| --- | --- | --- |
| TS | 3.7 | n.a. |
| TS-MW 1% $H_2$/He | 1.6 | 150 |
| TS-MW 10% $H_2$/He | 1.4 | 300 | n.a.: not applicable

TABLE 3

XPS data of treated and untreated poisoned NSR catalyst

| Sample | Time of MW heating [min] | % Atomic Concentration | | |
| --- | --- | --- | --- | --- |
| | | $SO_4^{2-}$ | $CO_3^{2-}$ | Oxygen |
| TS | n.a | 1.74 | 5.72 | 86.96 |
| TS-MW 1% $H_2$ | 150 | 0.684 | 4.77 | 52.21 |
| TS-MW 10% $H_2$ | 300 | 0.619 | 4.68 | 50.52 | n.a.: not applicable

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for removing sulfur and sulfur compounds from a catalyst comprising the steps of:
    a) providing a catalyst having a metal oxide support material that reacts with the sulfur and sulfur compounds forming sulfates;
    b) exposing the catalyst to a reducing atmosphere;
    c) exposing the catalyst to microwave energy;
wherein desorption of the sulfates from the catalyst occurs at a temperature less than 600 degrees centigrade.

2. The process of claim 1 wherein desorption of the sulfates occurs at a temperature of 200 degrees centigrade and higher.

3. The process of claim 1 further including the step of exposing the catalyst to water.

4. The process of claim 3 wherein the desorption of the sulfates occurs at a temperature of 150 degrees centigrade and higher.

5. The process of claim 1 wherein the reducing atmosphere comprises combustion exhaust gases.

6. The process of claim 5 wherein the combustion exhaust gases includes components selected from the group consisting of: nitrogen, water, carbon monoxide, carbon dioxide, oxygen, nitrogen oxide, nitrogen dioxide, hydrogen and hydrocarbons.

7. The process of claim 1 wherein the reducing atmosphere comprises hydrogen in a helium carrier.

8. The process of claim 7 wherein the hydrogen is present in an amount of from 1000 ppm to 10 percent in relation to the helium carrier.

9. The process of claim 1 wherein the microwave energy has a power of from 0.001 to 5000 Watts.

10. The process of claim 1 wherein the microwave energy has a frequency of from 2.0 to 4.0 Gigahertz.

11. The process of claim 1 wherein the catalyst comprises a nitrogen storage and reduction catalyst including a precious metal and an alkaline metal both dispersed in the metal oxide support material.

12. The process of claim 11 wherein the precious metal is selected from the group consisting of: Platinum, Palladium, Rhodium, Silver and Gold.

13. The process of claim 11 wherein the alkaline metal is selected from the group consisting of: Sodium, Magnesium, Potassium, Calcium, Rubidium, Strontium, Cesium, and Barium.

14. The process of claim 11 wherein the metal oxide support material is selected from the group consisting of: Aluminum Oxide, Cesium Oxide, Titanium Oxide, Zirconium Oxide and Silicon Oxide.

15. The process of claim 1 wherein the catalyst is selected from the group consisting of: a three way catalyst including a precious metal dispersed in a metal oxide support material, a hydrocracking catalyst; a hydrodesulfurization catalyst; and activated carbon used as a sulfur trap.

16. The process of claim 15 wherein the metal oxide support material is selected from the group consisting of: Aluminum Oxide, Cesium Oxide, Titanium Oxide, Zirconium Oxide and Silicon Oxide.

17. The process of claim 1 wherein the catalyst is dispersed on a monolithic substrate.

18. A process for removing sulfur and sulfur compounds from a catalyst comprising the steps of:
    a) providing a catalyst having a metal oxide support material that reacts with the sulfur and sulfur compounds forming sulfates;
    b) exposing the catalyst to a reducing atmosphere;
    c) exposing the catalyst to water;
    d) exposing the catalyst to microwave energy;
wherein desorption of the sulfates from the catalyst occurs at a temperature of 150 degrees centigrade and higher.

19. A process for removing sulfur and sulfur compounds from an automotive exhaust catalyst comprising the steps of:
    a) providing a catalyst containing substrate in an exhaust system of a vehicle, the catalyst containing substrate having a metal oxide support material that reacts with the sulfur and sulfur compounds forming sulfates;
    a) exposing the catalyst containing substrate to a reducing atmosphere;
    b) exposing the catalyst containing substrate to microwave energy;
wherein desorption of the sulfates from the catalyst occurs at a temperature of 200 degrees centigrade and higher.

20. The process of claim 19 including the step of exposing the catalyst to water and wherein desorption of the sulfur and sulfur compounds from the catalyst occurs at a temperature of 150 degrees centigrade and higher.

* * * * *